United States Patent
Stapleton

(10) Patent No.: US 12,368,602 B1
(45) Date of Patent: Jul. 22, 2025

(54) CRYPTOGRAPHIC RANDOM IDENTIFICATION (CRID) FOR AUTHENTICATION AND INDENTIFICATION OF USERS

(71) Applicant: Wells Fargo Bank, N.A., San Francisco, CA (US)

(72) Inventor: Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 344 days.

(21) Appl. No.: 18/099,084

(22) Filed: Jan. 19, 2023

(51) Int. Cl.
*H04L 9/32* (2006.01)
*H04L 9/08* (2006.01)

(52) U.S. Cl.
CPC .......... *H04L 9/3247* (2013.01); *H04L 9/0869* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 2005/0117747 A1* | 6/2005 | Valenti | H04L 9/0827 380/44 |
| 2007/0143530 A1* | 6/2007 | Rudelic | G06F 21/57 711/103 |
| 2012/0054491 A1* | 3/2012 | Tippett | H04L 9/3213 713/168 |
| 2012/0303961 A1* | 11/2012 | Kean | G06Q 40/00 713/171 |
| 2018/0108210 A1* | 4/2018 | Holst | G06F 21/6227 |
| 2020/0328886 A1* | 10/2020 | Newton | H04L 9/0819 |

* cited by examiner

*Primary Examiner* — William J. Goodchild
(74) *Attorney, Agent, or Firm* — Foley & Lardner LLP

(57) ABSTRACT

The arrangements of the present disclosure relate to systems, apparatuses, methods, and non-transitory computer-readable media for authenticating a participant associated with a first device by a second device, including generating, by the second device, a random number, determining, by the second device, a first Random Identifier (RID) using an ID of the first participant associated with the first device, the random number, and a key, sending, by the second device to the first device, the random number in response to a request received by the second device from the first device, receiving, by the second device from the first device, a second RID, and at least one of identifying or authenticating, by the second device, the first participant using the second RID for the request.

17 Claims, 4 Drawing Sheets

CRYPTOGRAPHIC RANDOM IDENTIFICATION (CRID) FOR AUTHENTICATION AND INDENTIFICATION OF USERS

BACKGROUND

Conventional authentication models between two devices include the first device (e.g., first participant) sending its authentication credential to the second device (e.g., second participant), and the second device verifying the authentication credentials of the first device. This allows the second device to have some level of assurance of the identity of the first device (e.g., the first device is in fact the first device).

Biometrics offer both a verification mode and an identification mode. In biometric verification, the first device sends its live biometric sample to the second device with a claimed identifier (e.g., a name), and the second device verifies the live sample of the first device against a stored template fetched from a database, where the fetching is performed using the claimed identity of the first device. The identity of the first device is verified because the live biometric sample of the first device matches the biometric template of the first device which the second device has stored from a previous enrollment process. Conversely, in biometric identification, the first device sends its lived biometric sample to the second device without any ID, and the second device searches the whole or partial database for a match with a biometric template. A candidate list of one or more IDs is created for the second device to further analyze in some examples. The identity of the first device is then determined, and the first device is authenticated by the second device. Other authentication factors are not used for identification. For example, knowledge factors such as passwords are not used for identification, given that different devices may have the same password. Possession factors such as object custody is not used for identification, given that objects can be lost, stolen, or counterfeited. On the other hand, biometric factors are unique and can be used for identification.

SUMMARY

The arrangements disclosed herein relate to systems, methods, non-transitory computer readable media, and apparatuses for authenticating a participant associated with a first device by a second device, including generating, by the second device, a random number, determining, by the second device, a first Random Identifier (RID) using an ID of the first participant associated with the first device, the random number, and a key, sending, by the second device to the first device, the random number in response to a request received by the second device from the first device, receiving, by the second device from the first device, a second RID, and at least one of identifying or authenticating, by the second device, the first participant using the second RID for the request.

The arrangements disclosed herein relate to systems, methods, non-transitory computer readable media, and apparatuses for authenticating a participant associated with a first device by a second device, including receiving, by the first device from the second device, a random number, a RID being generated by the second device using the random number, determining, by the first device, a second RID using an ID of the first participant associated with the first device, the received random number, and a key, and sending, by the first device to the second device, the second RID, wherein the first participant is at least one of identified or authenticated by the second device using the second RID for a request.

The arrangements disclosed herein relate to systems, methods, non-transitory computer readable media, and apparatuses for authenticating a participant associated with a first device by a second device, including determining, by the second device, a first Random Identifier (RID) using an ID of the first participant associated with the first device, a first random number, and a key, sending, by the second device to the first device, the first random number in response to a first request received by the second device from the first device, determining, by the first device, a second RID using the ID of the first participant associated with the first device, the received first random number, and the key, sending, by the first device to the second device, the second RID, and at least one of identifying or authenticating the first participant for the first request in response to receiving the second RID based on the first random number corresponding to the second RID, the second RID being same as the first RID.

These and other features, together with the organization and manner of operation thereof, will become apparent from the following detailed description when taken in conjunction with the accompanying drawings.

DETAILED DESCRIPTION

Arrangements of the present disclosure relate to systems, methods, apparatuses, and non-transitory computer-readable media for Cryptographic Random Identification (CRID) including employing a unique or random ID per authentication/identification request. As compared to conventional authentication schemes in which a user or device provides an static Identifier (ID) and is authenticated based on credentials associated with the ID, the arrangements of the present disclosure allow the user to provide a random ID which can be used for identification and authentication of the user.

Figure 1:
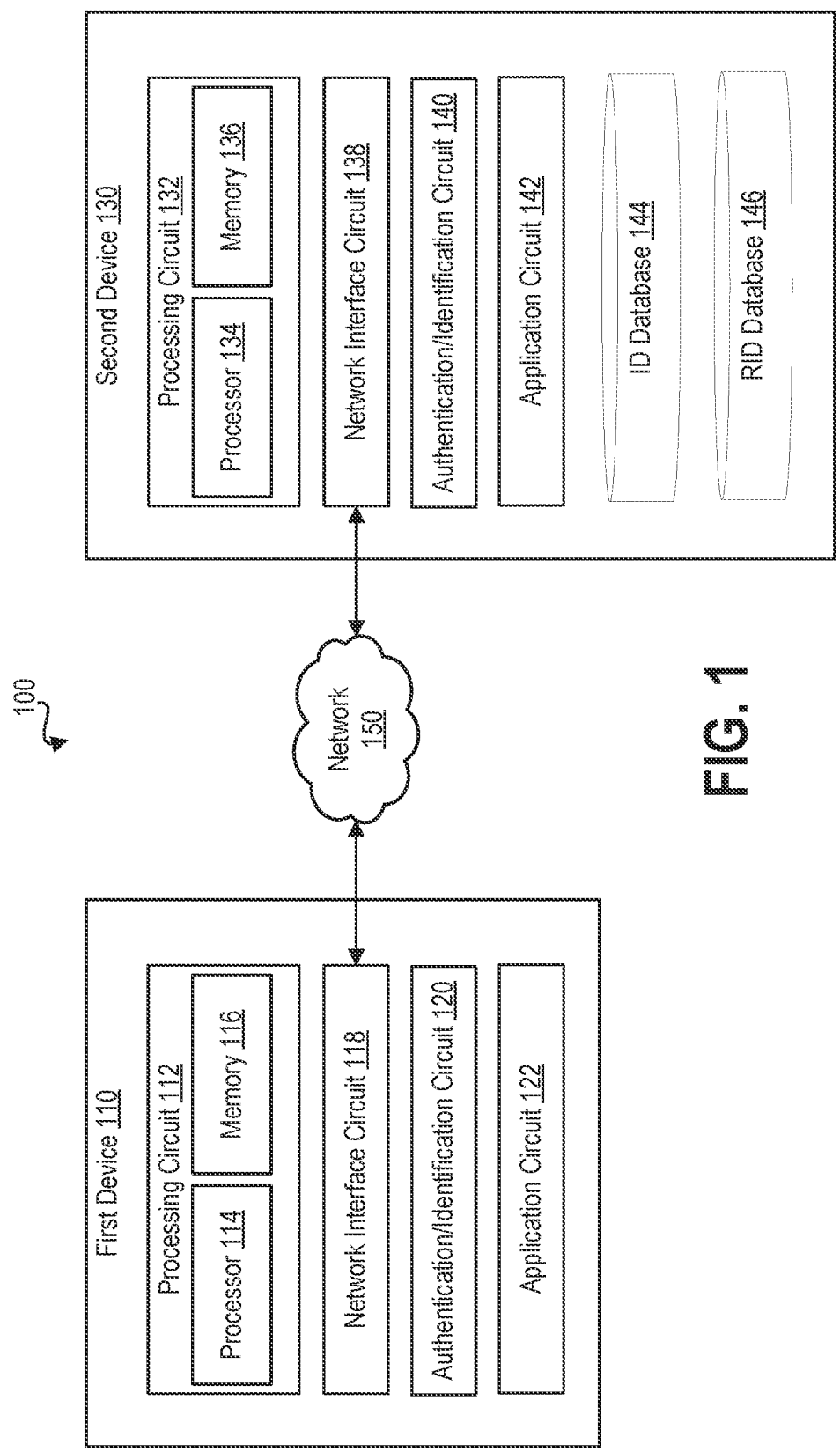
FIG. 1 is a block diagram of a system capable of implementing CRID-based identification and authentication methods, according to some arrangements.

FIG. 1 is a block diagram of a system 100 capable of implementing CRID-based identification and authentication methods, according to some arrangements. The system 100 includes at least a first device 110 and a second device 130. The first device 110 can be associated with a first participant in the identification and authentication scheme, where the first participant is to be identified and/or authenticated. The first participant can be a user, operator, application, or another entity to be identified and/or authenticated. An example of the first device 110 can be a client device. The second device 130 can be a second participant in the identification and authentication scheme, where the second device 130 identifies and/or authenticates the first participant. An example of the second device 130 can be a server. The first participant can be a server, application, or another entity that is configured to identify and/or authenticate the first participant.

Each of the first device 110 and the second device 130 is a computing system having processing, storage, and networking capabilities. In some arrangements, the first device 110 and the second device 130 can be Internet-connected or network-connected computing devices e.g., computers, servers, mobile devices, datacenters, smartphones, smart wearables, etc. Each of the first device 110 and the second device 130 can include any type of device or system configured to execute one or more software applications. In some arrangements, each of the first device 110 and the second device 130 can include an operating system (e.g., Windows, Linux, MAC OS, etc.) on which the software applications can be executed.

The first device 110 and the second device 130 can transfer communications, data, information, messages, certificates, and so on, using the network 150. The network 150 is any suitable Local Area Network (LAN), Wide Area Network (WAN), or a combination thereof. For example, the network 150 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 150 is structured to permit the exchange of data, values, instructions, messages, and the like.

In some arrangements, the first device 110 includes a processing circuit 112 having a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 116 is or includes tangible, non-transient volatile memory or non-volatile memory. Accordingly, the memory 116 includes database components, object code components, script components, or any other type of information structure for supporting the various activities and information structures described herein. The processing circuit 112 can be used to implemented one or more of the circuits 118, 120, and 122.

The network interface circuit 118 is configured for and structured to establish a connection and communicate with the second device 130 via the network 150. The network interface circuit 118 is structured for sending and receiving data over a communication network (e.g., the network 150). Accordingly, the network interface circuit 118 includes any of a cellular transceiver (for cellular standards), wireless network transceiver (for 802.11X, ZigBee, Bluetooth, Wi-Fi, or the like), wired network interface, or a combination thereof. For example, the network interface circuit 118 may include wireless or wired network modems, ports, baseband processors, and associated software and firmware.

The authentication/identification circuit 120 is structured to perform the authentication and/or identification methods as described herein. For example, the authentication/identification circuit 120 can determine an RID associated with the first device 110 based on a random number received from the second device 130, an ID, and a key, and uses the RID to authenticate or identify the first participant.

The application circuit 122 can be used to execute one or more applications or software on the first device 110. For example, the application circuit 122 can execute one or more applications that generate data, information, messages, and so. The application circuit 142 executes an application which needs the first participant associated with the first device 110 to be identified.

In some arrangements, the second device 130 includes a processing circuit 132 having a processor 134 and a memory 136. The processor 134 is implemented as a general-purpose processor, an ASIC, one or more FPGAs, a DSP, a group of processing components, or other suitable electronic processing components. The memory 136 (e.g., RAM, ROM, NVRAM, Flash Memory, hard disk storage, etc.) stores data and/or computer code for facilitating the various processes described herein. Moreover, the memory 136 is or includes tangible, non-transient volatile memory or non-volatile memory. Accordingly, the memory 136 includes database components, object code components, script components, or any other type of information structure for supporting the various activities and information structures described herein. The processing circuit 132 can be used to implemented one or more of the circuits 138, 140, and 142.

The network interface circuit 138 is configured for and structured to establish a connection and communicate with the first device 110 via the network 150. The network interface circuit 138 is structured for sending and receiving data over a communication network (e.g., the network 150). Accordingly, the network interface circuit 138 includes any of a cellular transceiver (for cellular standards), wireless network transceiver (for 802.11X, ZigBee, Bluetooth, Wi-Fi, or the like), wired network interface, or a combination thereof. For example, the network interface circuit 138 may include wireless or wired network modems, ports, baseband processors, and associated software and firmware.

The authentication/identification circuit 140 is structured to perform the authentication and/or identification methods as described herein. For example, the authentication/identification circuit 120 can determine an RID associated with the first device 110 based on a random number, an ID, and a key, and uses the RID to authenticate or identify the first participant.

The application circuit 142 can be used to execute one or more applications or software on the second device 130. For example, the application circuit 142 can execute one or more applications that generate data, information, messages, and so. The application circuit 142 executes an application which needs the first participant associated with the first device 110 to be identified.

The ID database 144 is a database of IDs of participants or devices, including an ID of the first participant or an ID of the first device 110. The RID database 146 is a database of RIDs of participants or devices, including an RID of the first participant or an RID of the first device 110.

Figure 2:
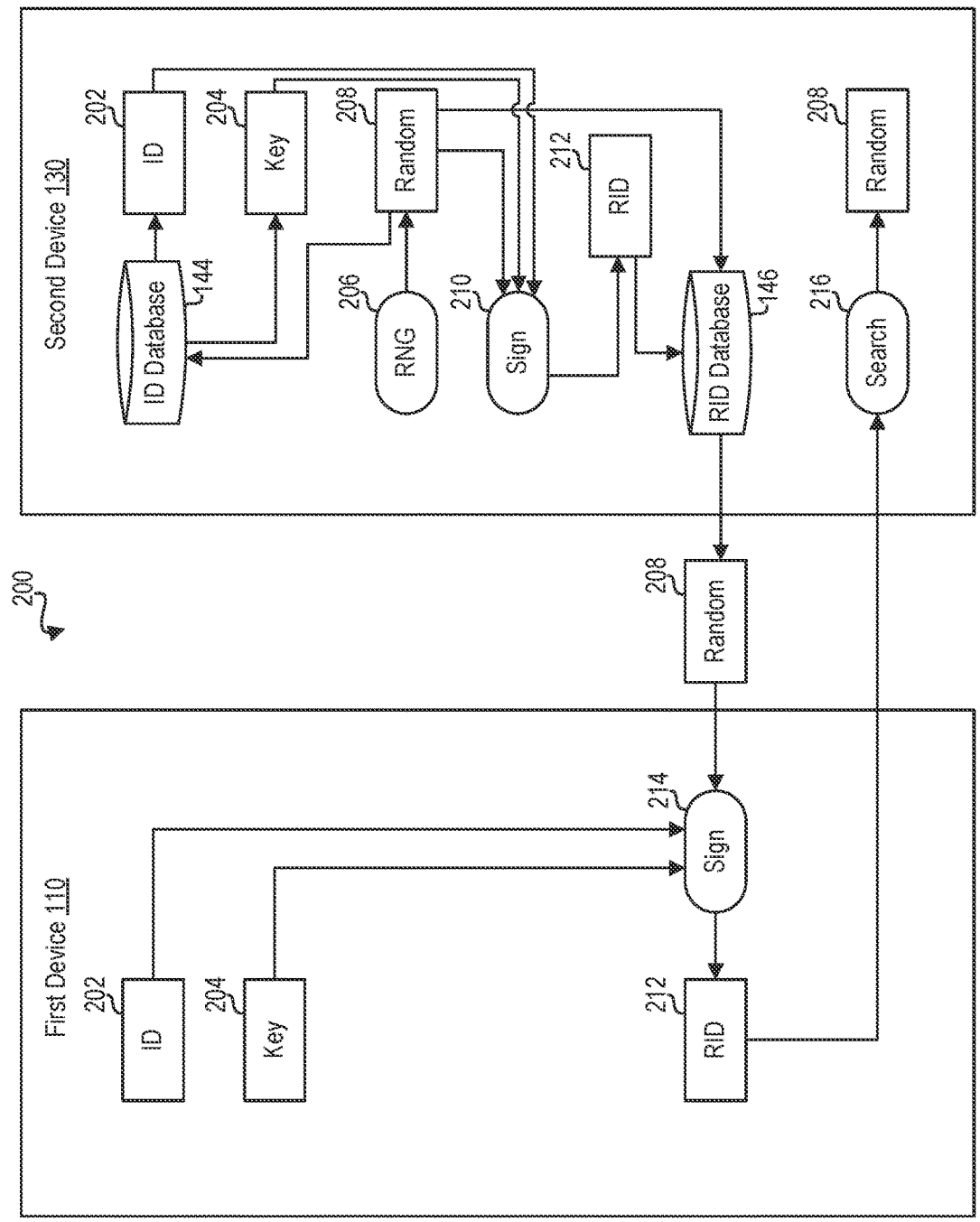
FIG. 2 is a schematic diagram illustrating an example CRID-based identification and authentication method, according to some arrangements.

FIG. 2 is a schematic diagram illustrating an example CRID-based identification and authentication method 200, according to some arrangements. The method 200 can be implemented using the system 100. The method 200 can be used as the first factor authentication method or the second factor authentication method.

In some examples, the second device 130 maintains a database of IDs referred to as the ID database 144. The ID database 144 stores an ID 202 of the first device 110 or the first participant associated with or using the first device 110. The ID 202 can be a username, a hash of a biometric template (e.g., in binary), and so on. The first device 110 also has knowledge of the ID 202. For example, the first device 110 can also include a suitable database or memory device that stores the ID 202. The first device 110 has a cryptographic key 204 to be used for the ID 202. For example, the first device 110 can store the cryptographic key 204 in a Hardware Security Module (HSM) or in a removable media (e.g., a Universal Serial Bus (USB)), where the cryptographic key 204 is protected (e.g., password-based protection). The first device 110 can provide the cryptographic key 204 to the second device 130. In some examples, the key 204 is a shared symmetric key. Symmetric cryptography is used given that it is post-quantum resistant. In some examples, the ID database 114 stores the ID 202 and the key 204 associated with the ID 202 together in a single entry or otherwise mapped to each other in any suitable manner. In some examples, the key 204 is stored in a HSM connected to the second device 130 via a network or a connection (e.g., the HSM is an Universal Serial Bus (USB) HSM). In some examples, the key 204 can be encrypted and stored locally in the second device 130 using a Key Encryption Key (KEK), which is stored inside of the HSM. In some examples, the second device 130 is a mobile device (e.g., a smart phone, a mobile phone, etc.), and the HSM (e.g., a dongle or a USB HSM) is coupled or otherwise connected to the second device 130. The second device 130 (e.g., the authentication/identification circuit 140) can retrieve the key 204 from the HSM and decrypt the key 204 before using the key 204 at 210. The key 204 may or may not be stored in the ID database 114 with the ID 202 after being retrieved from the HSM.

The second device 130 (e.g., the authentication/identification circuit 140) includes a Random Number Generator (RNG) 206 used to generate a random number 208. In some examples, the RNG 206 can generate the random number 208 in response to receiving an authentication/identification request from the first device 110.

The second device 130 (e.g., the authentication/identification circuit 140) wraps the random number 208 and the ID 202 using a cryptographic signature. The second device 130 (e.g., the authentication/identification circuit 140) combines the ID 202 with the random number 208 to generate an intermediate value. In some examples, the second device 130 (e.g., the authentication/identification circuit 140) concatenates the ID 202 with the random number 208. In some examples, the intermediate value is the XOR (e.g., bitwise XOR) of the ID 202 and the random number 208. The second device 130 (e.g., the authentication/identification circuit 140) signs (210) the combined ID 202 and random number 208 using the key 204, to create a cryptographic signature such as a Message Authentication Code (MAC), a keyed-Hashed Message Authentication Code (HMAC). The signature is used as an RID 212. The RID 212 is stored by the authentication/identification circuit 140 in a database of RIDs referred to as the RID database 146. The ID database 144 and the RID database 146 are different databases. The ID database 144 and the RID database 146 being different databases allow improved management of the IDs and the RIDs and faster processing time of RIDs. For example, the ID database 144 may store a large number of IDs (e.g., corresponding to different users of an application or platform), where the RID database 146 may store a significantly less number of RIDs, as RIDs may be generated for or in response to requests and replaced due to time-to-live or due to being used. The RID database 146 may experience more adding and removing operations involving RIDs and random numbers. The RID database 146 can be used to indicate a current status (e.g., a current RID) generated for a particular request using the random number 208 and the ID 202. In some examples, the random number 208 is stored along with the RID 212. In some examples, the second device 130 (e.g., the authentication/identification circuit 140) adds the random number 208 a profile of the first device 110 in the ID database 144.

In some examples, the RNG 206 can generate multiple random numbers (for different IDs of different participants) as a batch in advance, before receiving the corresponding authentication/identification requests from devices of those participants. In some examples, the sign function 210 can generate multiple RIDs (for different IDs of different participants) using those random numbers as a batch in advance, before receiving the corresponding authentication/identification requests from first devices of those participants. The multiple random numbers and the multiple RIDs can be stored in the ID database 144 and the RID database 146 as described. The random numbers and the RIDs for different participants can be generated in batch at certain times in anticipation of expected workload. For example, at a predetermined time (e.g., 7 AM) for each work day, the second device 130 can generate the random numbers or the RIDs (based on the random numbers) for different participants (e.g., difference IDs), in anticipation of morning workday login requests. Such mechanism alleviates congestion caused by the RNG 206 and the sign function 210 during peak time periods.

In some examples, the first device 110 sends an authentication/identification request to the second device 130. For example, the authentication/identification circuit 120 can configure the network interface circuit 118 to send the authentication/identification request via the network 150. The network interface circuit 138 receives the authentication/identification request and passes the request to the authentication/identification circuit 140. Examples of the authentication/identification request include a log-on request for requesting to log the first participant into an application provided by the second device 130, an access request for accessing information, data, or an application hosted or provided by the second device 130, a download request for downloading data stored or managed by the second device 130, and so on. In response to the request, the second device 130 sends the random number 208 to the first device 110. For example, the authentication/identification circuit 140 can configure the network interface circuit 138 to send the random number 208 via the network 150. The network interface circuit 118 receives the random number 208 and passes the random number 208 to the authentication/identification circuit 120.

The first device 110 (e.g., the authentication/identification circuit 120) combines the ID 202 with the random number 208. In some examples, the first device 110 (e.g., the authentication/identification circuit 120) concatenates the ID 202 with the random number 208. In some examples, intermediate value is the XOR (e.g., bitwise XOR) of the ID 202 and the random number 208. The first device 110 (e.g., the authentication/identification circuit 120) signs (214) the combined ID 202 and random number 208 using the key 204, to create a cryptographic signature such as a MAC, a HMAC. The signature is used as an RID 212. Accordingly, the first device 110 can generate the same RID using the random number 208 received from the second device. The sign functions 210 and 214 are the same, resulting in the first device 110 deriving the same RID 212. In some examples, the first device 110 stores the key 204 in a suitable database or memory device. In some examples, the key 204 is stored in an HSM connected to the first device 110 via a network or a connection (e.g., the HSM is a dongle or an Universal Serial Bus (USB) HSM). In some examples, the first device 110 is a mobile device (e.g., a smart phone, a mobile phone, etc.), and the HSM (e.g., a dongle or a USB HSM) is coupled or otherwise connected to the first device 110. The first device 110 (e.g., the authentication/identification circuit 120) can retrieve the key 204 from the HSM and decrypt the key 204 before using the key 204 at 214.

In some examples, the first device 110 sends the RID 212 to the second device 130 for identification and authentication. For example, the authentication/identification circuit 120 can configure the network interface circuit 118 to send the RID 212 via the network 150. The network interface circuit 138 receives the RID 212 and passes the RID 212 to the authentication/identification circuit 140. In some examples, the authentication/identification circuit 140 of the second device 130 verifies or validate the signature on the RID 212 received from the first device 110. The RID 212 received from the first device 110 can be used to authenticate the first participant.

The second device 130 (e.g., the authentication/identification circuit 140) searches (216) the RID database 146 to identify or locate the current random number 208 associated with the RID 212. The second device 130 (e.g., the authentication/identification circuit 140) uses that random number 208 to search the ID database 144 to identify or locate the ID 202 and the key 204. The ID 202 can be used to identify the first participant. The second device 130 (e.g., the authentication/identification circuit 140) uses the ID 202, the random number 208, and the key 204 to regenerate the RID 212 as described. In response to generating the RID 212, the ID 202 is verified. The first device 110 or the first participant has now been identified and authenticated based on the RID 212. In some examples, the signature on the RID 212 received from the first device 110 can include metadata such as an identifier, name, or version number of the key 204. In response to determining that at least one of the identifier, name, or version number of the key 204 used to sign the RID 212 received from the first device 110 is different from the identifier, name, or version number of the key 204 used by the second device 130 to sign the RID 212 at 210, the second device 130 sends an out-of-synch response to the first device 110 indicating that the key 204 used by the first device 110 is out-of-synch with the key 204 used by the second device 130.

In response to identifying and authenticating the first device 110 or the first participant, the second device 130 (e.g., the authentication/identification circuit 140) generates a new random number using the RNG 206 and repeats this process for a subsequent identification request. For example, a new RID can be generated using the same ID 202, the same key 204, but different random number, resulting in a different RID. Accordingly, given that the random number used for each authentication/identification request is different, the resulting RID for each authentication/identification request is likewise different.

In some examples, the RID 212 and/or the random number 208 can be stored in the RID database 146 no longer than a Time-To-Live, which is a period of time (e.g., 5 minutes, 30 minutes, 1 hour, 5 hours, 24 hours, and so on). After the predetermined period of time, the RID 212 and/or the random number 208 can be deleted form the RID database 146, and a new RID can be generated using a new random number, which are stored together in the RID database 146. In some examples, the random number 208 can be stored in the ID database 144 no longer than a period of time (e.g., 5 minutes, 30 minutes, 1 hour, 5 hours, 24 hours, and so on). After the predetermined period of time, the random number 208 can be deleted form the ID database 144. Accordingly, the random number 208 has a time-to-live corresponding to the period of time. In response to determining that the time-to-live of the random number 208 has expired, a new random number is generated and stored, based on which a new RID is generated and stored. This improves security of the RID. In some examples, a new random number is different from a number (e.g., 5, 10, 20, or so on) previously generated random numbers to improve security. In response to determining that a first random number is the same as any of the number of previously generated random numbers, a second random number is generated to replace the first random number.

Figure 3:
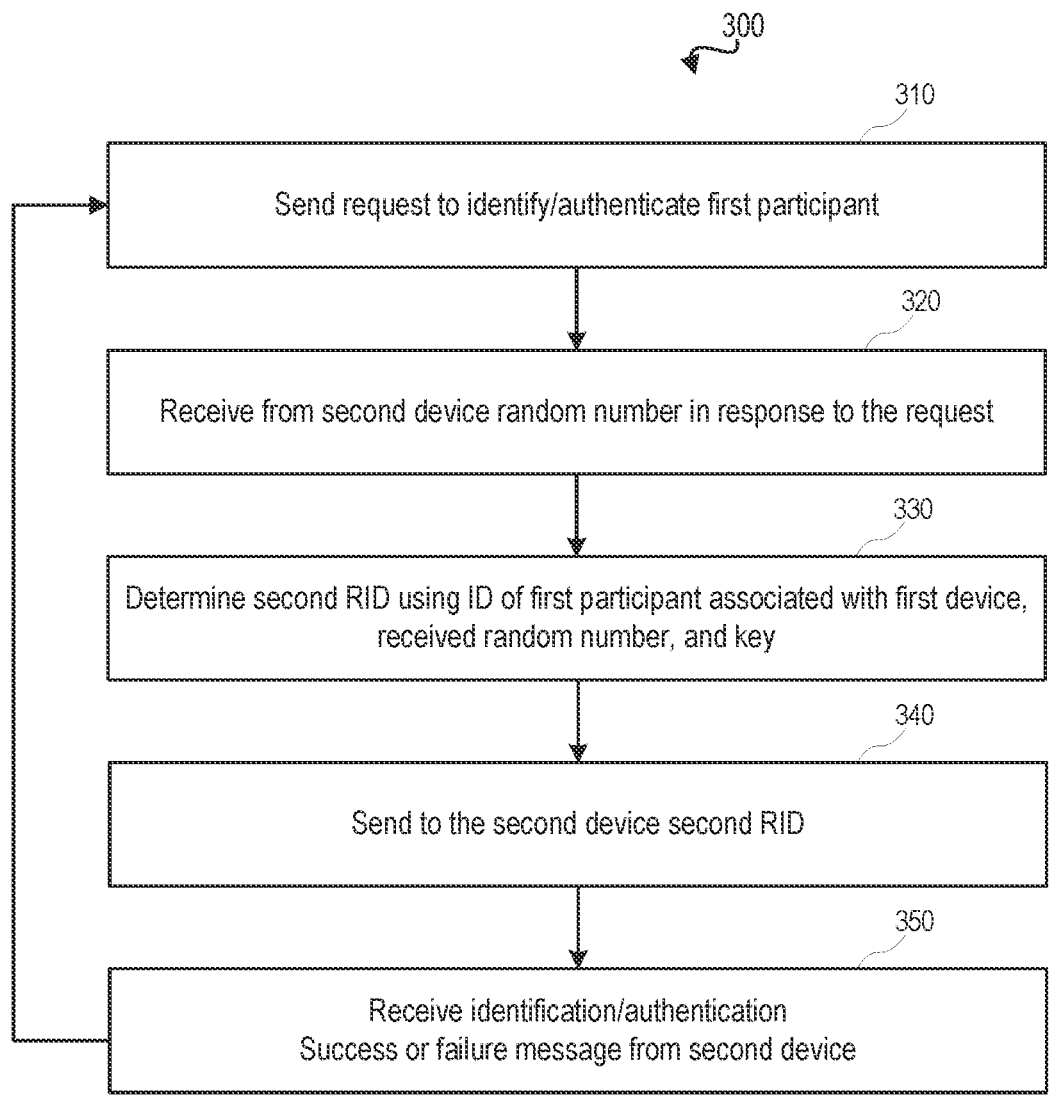
FIG. 3 is a flow diagram illustrating an example CRID-based identification and authentication method, according to various arrangements.

FIG. 3 is a flow diagram illustrating an example CRID-based identification and authentication method 300, according to various arrangements. The method 300 is an example implementation of the method 200 and can be implemented using the system 100, and in particular, the first device 110. In some examples, the authentication/identification circuit 120 of the first device 110 stores the ID 202 of the first participant associated with the first device 110 and the key 204 in a database or another suitable memory device. The key 204 is a shared symmetric key. The key 204 is provided to the second device 130 by the first device 110.

At 310, the authentication/identification circuit 120 of the first device 110 sends to the second device 130 a request (e.g., a first request) to identify/authenticate (e.g., an authentication/identification request) the first participant. At 320, in response to the request, the authentication/identification circuit 120 of the first device 110 receives from the second device 130 the random number 208, based on which a first RID (e.g., RID 212) is generated by the second device 130.

At 330, the authentication/identification circuit 120 of the first device 110 determines a second RID using the ID 202 of the first participant associated with the first device 110, the received random number 208, and the key 204. In some examples, determining the second RID includes determining, by the authentication/identification circuit 120 of the first device 110, an intermediate value by combining the ID 202 of the first participant with the received random number 208. The authentication/identification circuit 120 of the first device 110 determines a cryptographic signature by signing the intermediate value using the key 204. The second RID is the signed intermediate value. In some examples, combining the ID 202 of the first participant with the received random number 208 includes concatenating the ID 202 of the first participant with the random number 208. The cryptographic signature includes a MAC or a HMAC. In some examples, the intermediate value is the XOR (e.g., bitwise XOR) of the ID 202 and the random number 208.

At 340, the authentication/identification circuit 120 of the first device 110 sends to the second device 130, the second RID. The first participant is at least one of identified or authenticated by the second device 130 using the second RID for the request.

At 350, the authentication/identification circuit 120 of the first device 110 receives from the second device 130 an identification/authentication success message in response to the second device 130 identifying and/or authenticating the first participant using the second RID or an identification/authentication failure message in response to the second device 130 failing to identify and/or authenticate the first participant using the second RID.

In some examples, the method 300 return to 310 where a new identification/authentication request (e.g., a second request after the first request) is sent by the first device 110 to the second device 130. For example, at 310, the authentication/identification circuit 120 of the first device 110 sends to the second device 130 another request to identify/authenticate (e.g., an authentication/identification request) the first participant. At 320, in response to the another request, the authentication/identification circuit 120 of the first device 110 receives from the second device 130 another random number, based on which a third RID is generated by the second device 130. At 330, the authentication/identification circuit 120 of the first device 110 determines a fourth RID using the ID 202 of the first participant associated with the first device 110, the received another random number, and the key 204. At 340, the authentication/identification circuit 120 of the first device 110 sends to the second device 130, the fourth RID. The first participant is at least one of identified or authenticated by the second device 130 using the fourth RID for the another request. At 350, the authentication/identification circuit 120 of the first device 110 receives from the second device 130 an identification/authentication success message in response to the second device 130 identifying and/or authenticating the first participant using the fourth RID or an identification/authentication failure message in response to the second device 130 failing to identify and/or authenticate the first participant using the fourth RID.

Figure 4:
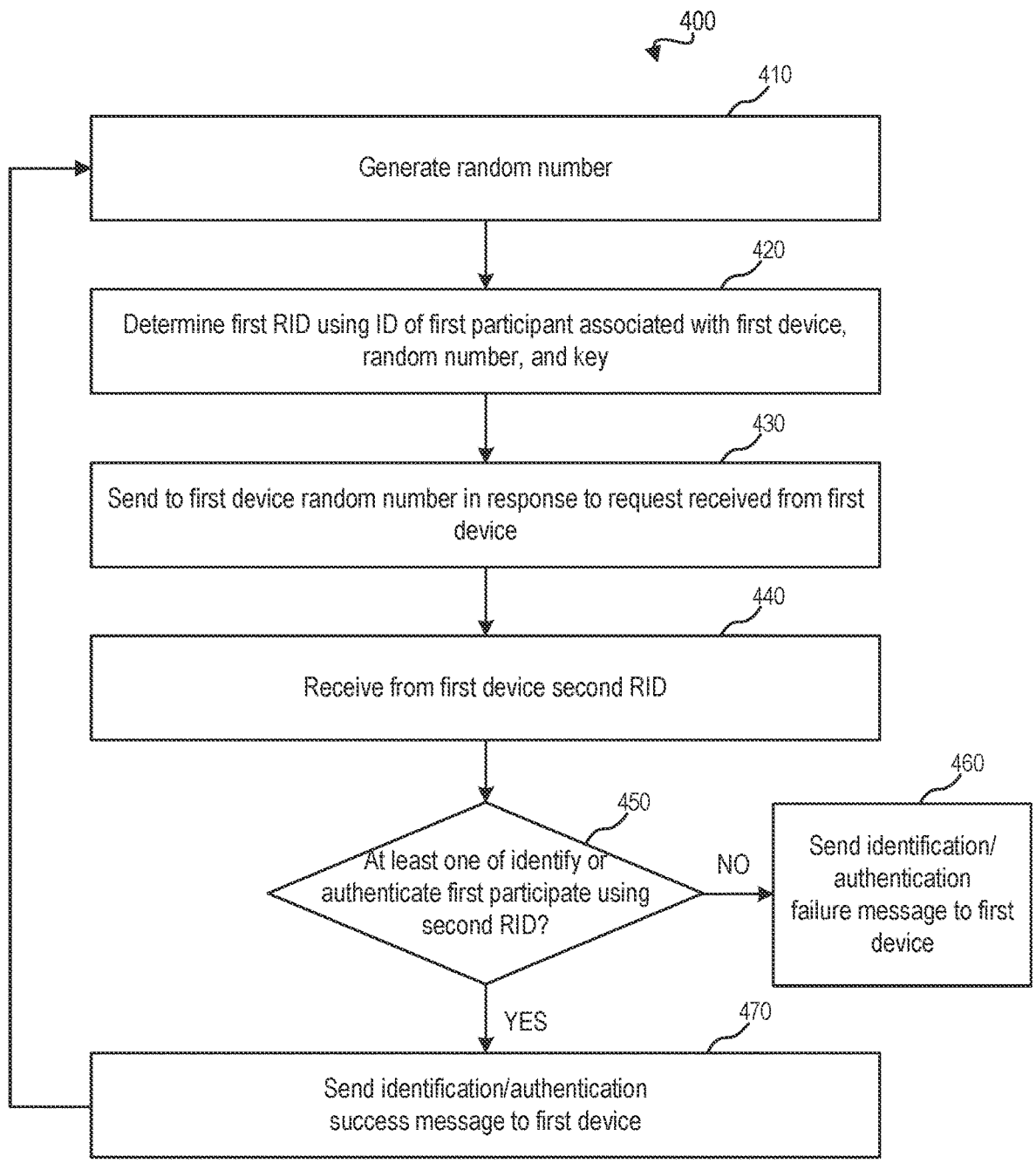
FIG. 4 is a flow diagram illustrating an example CRID-based identification and authentication method, according to various arrangements.

FIG. 4 is a flow diagram illustrating an example CRID-based identification and authentication method 400, according to various arrangements. The method 400 is an example implementation of the method 200 and can be implemented using the system 100, and in particular, the second device 130. In some examples, the authentication/identification circuit 140 of the second device 130 stores the ID 202 of the first participant associated with the first device 110 and the key 204 in the ID database 144. The key 204 is a shared symmetric key. The key 204 is provided to the second device 130 by the first device 110 in some examples. In some examples, the second device 130 provides the key 204 to the first device 110, which allows the second device 130 to provision the key 204 to first device 110 that cannot generate keys.

At 410, the authentication/identification circuit 140 of the second device 130 generates the random number 208, for example, using the RNG 206. The random number 208 can be generated in response to receiving an authentication/identification request (e.g., a first request) from the first device 110 for which the random number 208 is used or before receiving the next authentication/identification request from the first device 110 for which the random number 208 is used. In some examples, the RNG 206 can generated multiple random numbers in advance, before receiving the corresponding authentication/identification requests, as described.

At 420, the authentication/identification circuit 140 of the second device 130 determines a first RID (e.g., the RID 212) using the ID 202 of the first participant associated with the first device 110, the random number 208, and the key 204.

In some examples, determining the first RID includes determining, by the authentication/identification circuit 140 of the second device 130, an intermediate value by combining the ID 202 of the first participant with the random number 208. The authentication/identification circuit 140 of the second device 130 determines a cryptographic signature by signing the intermediate value using the key 204. The first RID is the signed intermediate value. In some examples, combining the ID 202 of the first participant with the random number 208 includes concatenating the ID 202 of the first participant with the random number 208. In some examples, the intermediate value is the XOR (e.g., bitwise XOR) of the ID 202 and the random number 208. The cryptographic signature includes a MAC or a HMAC. In some examples, the authentication/identification circuit 140 of the second device 130 stores the first RID with the random number 208 in the RID database 146. For example, the first RID and the associated random number 208 can be stored in a single entry in the RID database 146 or can be mapped to one another in any suitable manner. In some examples, the authentication/identification circuit 140 of the second device 130 stores the random number 208 with the ID 202 of the first participant in the ID database 144. For example, the ID 202 and the associated random number 208 can be stored in a single entry in the ID database 144 or can be mapped to one another in any suitable manner.

At 430, the authentication/identification circuit 140 of the second device 130 sends to the first device 110 the random number 208 in response to a request (e.g., an authentication/identification request) received by the second device 130 from the first device 110. At 440, the authentication/identification circuit 140 of the second device 130 receives from the first device 110 a second RID (e.g., the RID 212). The second RID is determine by the authentication/identification circuit 120 of the first device 110 using the ID 202 of the first participant, the random number 208 received by the first device 110 from the second device 130, and the key 204.

At 450, the authentication/identification circuit 140 of the second device 130 identifies and/or authenticates the first participant using the second RID for the request. For example, the authentication/identification circuit 140 of the second device 130 identifies the random number 208 by searching (at 216) the second RID in the RID database 146, and in the example in which the second RID is same as the first RID, the random number 208 corresponding to the RID 212 can be identified. The authentication/identification circuit 140 of the second device 130 identifies the ID 202 of the first participant by searching the random number 208 in the ID database 144, the ID 202 of the first participant corresponding to the random number 208 can be identified. In response to determining that no ID matches the random number determined based on the RID received from the first device 110, the first participant has not been identified. The second device 130 (e.g., the authentication/identification circuit 140) uses the ID 202, the random number 208, and the key 204 to regenerate the RID 212. In response to regenerating the RID 212, the ID 202 is verified. The first device 110 or the first participant has now been identified and authenticated based on the RID 212. On the other hand, in response to generating an RID that is different from the RID received from the first device 130, the first participant has not been identified or authenticated. In some examples, in response to determining that the RID received from the first device 130 corresponds to an RID or a random number whose TTL has expired, authentication and identification has failed. In some examples, in response to determining that the RID received from the first device 130 corresponds to an RID or a random number whose TTL has expired within a predetermined time period (e.g., 5 seconds, 10 seconds, 1 minute, 30 minutes, and so on) before receiving the RID from the first device 110, authentication and identification using the received RID can proceed as described.

In response to failing to identify and/or authenticate the first participant (450: NO), the authentication/identification circuit 140 sends an authentication/identification failure message to the first device 110, at 460. On the other hand, in response to identifying and/or authenticating the first participant (450: YES), the authentication/identification circuit 140 sends an authentication/identification success message to the first device 110, at 470.

In some examples, the method 400 return to 410 where a new random number is generated for a subsequent authentication/identification received from the first device 110. For example, at 410, the authentication/identification circuit 140 of the second device 130 generates another random number, for example, using the RNG 206. The RNG 206 can use the previously used random number 208 for the previous request as a seed for generating the new random number. At 420, the authentication/identification circuit 140 of the second device 130 determines a third RID (e.g., the RID 212) using the ID 202 of the first participant associated with the first device 110, the another random number, and the key 204. At 430, the authentication/identification circuit 140 of the second device 130 sends to the first device 110 the another random number in response to a subsequent request (e.g., another authentication/identification request such as a second request) received by the second device 130 from the first device 110. At 440, the authentication/identification circuit 140 of the second device 130 receives from the first device 110 a fourth RID. At 450, the authentication/identification circuit 140 of the second device 130 identifies and/or authenticates the first participant using the fourth RID for the another request.

In some examples, blocks 410-430 are performed by one device while blocks 440-470 are performed by another device. That is, the second device 130 can include two different devices, where one device is used to generate the random number, and another device is used to identify and authenticate the first participant.

Accordingly, the arrangements disclosed herein can identify the first participant without providing the actual ID (e.g., ID 202) of the first participant and allow for simultaneous identification and authentication the first participant. In fact, the ID 202 of the first participant is not revealed and the RID is unique per request as a new random number is generated for each request.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for authenticating a participant associated with a first device by a second device, comprising:
    generating, by the second device, a random number;
    determining, by the second device, a first Random Identifier (RID) using an ID of the first participant associated with the first device, the random number, and a key, wherein determining the first RID comprises:
        determining, by the second device, an intermediate value by combining the ID of the first participant with the random number; and
        determining, by the second device, a cryptographic signature by signing the intermediate value using the key, wherein the first RID is the signed intermediate value;
    sending, by the second device to the first device, the random number in response to a request received by the second device from the first device;
    receiving, by the second device from the first device, a second RID; and
    at least one of identifying or authenticating, by the second device, the first participant using the second RID for the request.

2. The method of claim 1, comprising storing the ID of the first participant and the key in an ID database.

3. The method of claim 1, wherein the key is a shared symmetric key.

4. The method of claim 1, wherein at least one of:
    the key is provided to the second device by the first device;
    the key is provided to the first device by the second device.

5. The method of claim 1, wherein combining the ID of the first participant with the random number comprises concatenating the ID of the first participant with the random number.

6. The method of claim 1, wherein the cryptographic signature comprises a Message Authentication Code (MAC) or a keyed-Hashed Message Authentication Code (HMAC).

7. The method of claim 1, wherein the second RID is determine by the first device using the ID of the first participant, the random number received by the first device from the second device, and the key.

8. The method of claim 1, comprising:
    storing, by the second device, the first RID with the random number in an RID database;
    storing, by the second device, the random number with the ID of the first participant;

identifying the random number by searching the second RID in the RID database, the second RID being same as the first RID, the random number corresponding to the first RID and the second RID; and identifying the ID of the first participant by searching the random number in the ID database, the ID of the first participant corresponding to the random number.

9. The method of claim 1, comprising:
generating, by the second device, another random number;
determining, by the second device, a third Random Identifier (RID) using the ID of the first participant, the another random number, and the key;
sending, by the second device to the first device, the another random number to the first device in response to another request received by the second device from the first device;
receiving, by the second device from the first device, a fourth RID; and
at least one of identifying or authenticating, by the second device, the first participant using the fourth RID for the another request.

10. A method for authenticating a participant associated with a first device by a second device, comprising:
receiving, by the first device from the second device, a random number, a first Random Identifier (RID) being generated by the second device using the random number, wherein determining the second RID comprises:
determining, by the first device, an intermediate value by combining the ID of the first participant with the random number; and
determining, by the first device, a cryptographic signature by signing the intermediate value using the key, wherein the second RID is the signed intermediate value;
determining, by the first device, a second RID using an ID of the first participant associated with the first device, the received random number, and a key; and
sending, by the first device to the second device, the second RID, wherein the first participant is at least one of identified or authenticated by the second device using the second RID for a request.

11. The method of claim 10, comprising sending, by the first device to the second device, the request, wherein the random number is received from the second device as a response to the request.

12. The method of claim 10, comprising providing, by the first device to the second device, the key, the key being a shared symmetric key.

13. The method of claim 10, wherein combining the ID of the first participant with the random number comprises concatenating the ID of the first participant with the random number.

14. The method of claim 10, wherein the cryptographic signature comprises a Message Authentication Code (MAC) or a keyed-Hashed Message Authentication Code (HMAC).

15. The method of claim 10, comprising:
receiving, by the first device from the second device, another random number, a third RID being generated by the second device using the another random number;
determining, by the first device, a fourth RID using an ID of the first participant associated with the first device, the received another random number, and the key; and
sending, by the first device to the second device, the fourth RID, wherein the first participant is at least one of identified or authenticated by the second device using the fourth RID for another request.

16. A method for authenticating a participant associated with a first device by a second device, comprising:
determining, by the second device, a first Random Identifier (RID) using an ID of the first participant associated with the first device, a first random number, and a key;
sending, by the second device to the first device, the first random number in response to a first request received by the second device from the first device;
determining, by the first device, a second RID using the ID of the first participant associated with the first device, the received first random number, and the key, wherein determining the first RID or the second RID comprises:
determining an intermediate value by combining the ID of the first participant with the first random number; and
determining a cryptographic signature by signing the intermediate value using the key, wherein the first RID or the second RID is the signed intermediate value;
sending, by the first device to the second device, the second RID; and
at least one of identifying or authenticating the first participant for the first request in response to receiving the second RID based on the first random number corresponding to the second RID, the second RID being same as the first RID.

17. The method of claim 16, comprising:
determining, by the second device, a third RID using the ID of the first participant associated with the first device, a second random number, and the key;
sending, by the second device to the first device, the second random number in response to a second request received by the second device from the first device;
determining, by the first device, a fourth RID using the ID of the first participant associated with the first device, the received second random number, and the key;
sending, by the first device to the second device, the fourth RID; and
at least one of identifying or authenticating the first participant for the second request in response to receiving the fourth RID based on the second random number corresponding to the fourth RID, the fourth RID being same as the third RID.

* * * * *